US012651741B2

(12) United States Patent
Jung et al.

(10) Patent No.: US 12,651,741 B2
(45) Date of Patent: Jun. 9, 2026

(54) CATHODE ACTIVE MATERIAL AND LITHIUM ION BATTERY COMPRISING SAID CATHODE ACTIVE MATERIAL

(71) Applicant: Bayerische Motoren Werke Aktiengesellschaft, Munich (DE)

(72) Inventors: Roland Jung, Munich (DE); Thomas Woehrle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 531 days.

(21) Appl. No.: 18/007,877

(22) PCT Filed: Jul. 7, 2021

(86) PCT No.: PCT/EP2021/068759
§ 371 (c)(1),
(2) Date: Dec. 2, 2022

(87) PCT Pub. No.: WO2022/022956
PCT Pub. Date: Feb. 3, 2022

(65) Prior Publication Data
US 2023/0253548 A1     Aug. 10, 2023

(30) Foreign Application Priority Data

Jul. 28, 2020     (DE) ..................... 10 2020 119 842.6

(51) Int. Cl.
*H01M 4/36*          (2006.01)
*C01G 45/1242*       (2025.01)
(Continued)

(52) U.S. Cl.
CPC ........ *H01M 4/366* (2013.01); *C01G 45/1242* (2013.01); *H01M 4/131* (2013.01);
(Continued)

(58) Field of Classification Search
CPC ...... H01M 4/366; H01M 4/131; H01M 4/505; H01M 10/0525; H01M 4/525;
(Continued)

(56) References Cited

U.S. PATENT DOCUMENTS 4,507,371 A      3/1985  Thackeray et al.
2013/0183588 A1  7/2013  Oh et al.
(Continued)

FOREIGN PATENT DOCUMENTS

CN      105895856    *  8/2016
CN      105938917 A     9/2016
(Continued)

OTHER PUBLICATIONS

Barker et al. J Power Sources 54 (1995) 475-478 (Year: 1995).*
(Continued)

*Primary Examiner* — Lisa S Park
(74) *Attorney, Agent, or Firm* — Crowell & Moring LLP

(57)          ABSTRACT
A cathode active material for a lithium ion battery includes particles having a core-shell structure, where each of the particles has a core including a core material and a shell including a shell material. The core material is selected from the group consisting of: layered oxides, including overlithiated layered oxides, compounds having an olivine structure, compounds having a spinel structure, and combinations thereof. The shell material includes a spinel compound. The shell material and/or the core material is at least partially delithiated.

8 Claims, 1 Drawing Sheet

(51) Int. Cl.
 *H01M 4/131*     (2010.01)
 *H01M 4/505*     (2010.01)
 *H01M 10/0525*    (2010.01)

(52) U.S. Cl.
 CPC ....... *H01M 4/505* (2013.01); *H01M 10/0525*
   (2013.01); *C01P 2004/61* (2013.01); *C01P*
            *2004/62* (2013.01)

(58) Field of Classification Search
 CPC .......... H01M 10/052; H01M 2004/028; C01G
   45/1242; C01P 2004/61; C01P 2004/62;
            Y02E 60/10
 See application file for complete search history.

(56)       References Cited

U.S. PATENT DOCUMENTS

| | | | | |
|---|---|---|---|---|
| 2014/0242456 | A1* | 8/2014 | Taki ................. | H01M 10/0567 |
| | | | | 429/188 |
| 2017/0018760 | A1 | 1/2017 | Lupart et al. | |
| 2018/0083279 | A1 | 3/2018 | Takami et al. | |
| 2018/0123187 | A1* | 5/2018 | Ho ........................ | H01M 10/44 |
| 2018/0316009 | A1* | 11/2018 | Park ...................... | H01M 4/525 |

FOREIGN PATENT DOCUMENTS

| | | | |
|---|---|---|---|
| CN | 108807864 | A | 11/2018 |
| CN | 110383541 | A | 10/2019 |
| CN | 111293285 | A | 6/2020 |
| DE | 3319939 | A1 | 12/1983 |
| DE | 10 2014 205 945 | A1 | 10/2015 |
| EP | 0 017 400 | B1 | 5/1984 |
| JP | 4-87152 | A | 3/1992 |
| JP | 2018-45965 | A | 3/2018 |
| KR | 20160039983 | A | 4/2016 |
| KR | 20170142393 | A | 12/2017 |
| WO | WO-2019093864 | A2 | 5/2019 |

OTHER PUBLICATIONS

Mukai et al. J Solid State Chem 184 (2011) 1096-1104 (Year: 2011).*

Pascual et al. "Lithium-deficient LiYMn2O4 spinels ($0.9 \leq Y < 1$): Lithium content, synthesis temperature, thermal behaviour and electrochemical properties" Electrochim. Acta 51 (2006) 3193-3201) (Year: 2006).*

International Search Report (PCT/ISA/210) issued in PCT Application No. PCT/EP2021/068759 dated Sep. 27, 2021 with English translation (four (4) pages).

German-language Written Opinion (PCT/ISA/237) issued in PCT Application No. PCT/EP2021/068759 dated Sep. 27, 2021 (five (5) pages).

German-language Search Report issued in German Application No. 10 2020 119 842.6 dated Apr. 8, 2021 with partial English translation (10 pages).

Yu, Wu et al., "Scalable and general synthesis of spinel manganese-based cathodes with hierarchical yolk-shell structure and superior lithium storage properties", Nano Research, Tsinghua University Press, CN, vol. 11, No. 1, Aug. 2, 2017, pp. 246-253, XP036387557.

Korean-language Office Action issued in Korean Application No. 10-2022-7039498 dated Oct. 28, 2024 with English translation (11 pages).

Japanese-language Office Action issued in Japanese Application No. 2022-577537 dated Aug. 6, 2025 with English translation (8 pages).

Chinese language Office Action issued in CN Application No. 202180037378.7 dated Dec. 30, 2025, with English translation (21 pages).

Korean-language Office Action issued in Korean Application No. 10-2022-7039498 dated Jun. 30, 2025 with English translation (11 pages).

Japanese-language Office Action issued in Japan Application No. 2022-577537 dated Feb. 25, 2026, with English translation (8 pages).

\* cited by examiner 1    2      3   4      5   6

CATHODE ACTIVE MATERIAL AND LITHIUM ION BATTERY COMPRISING SAID CATHODE ACTIVE MATERIAL

BACKGROUND AND SUMMARY

The invention relates to a cathode active material for a lithium-ion battery and a lithium-ion battery comprising such a cathode active material.

In the following the term "lithium-ion battery" is used synonymously with all designations for lithium-containing galvanic elements and cells commonly used in the prior art, for example lithium battery cell, lithium battery, lithium-ion battery cell, lithium cell, lithium-ion cell, lithium polymer cell, lithium polymer battery and lithium-ion accumulator. Rechargeable batteries (secondary batteries) are especially included. The terms "battery" and "electrochemical cell" are also used synonymously with the term "lithium-ion battery" and "lithium-ion battery cell." The lithium-ion battery may also be a solid-state battery, for example a ceramic or polymer-based solid-state battery.

A lithium-ion battery has at least two different electrodes, one positive (cathode) and one negative (anode). Each of these electrodes has at least one active material, optionally together with additives such as electrode binders and electrical conductivity additives.

Suitable cathode active materials are known from EP 0 017 400 B1 and DE 3319939 A1. Published specification DE 10 2014 205 945 A1 describes a cathode active material comprising particles where a core of lithium transition metal oxide has been provided with a coating, wherein the coating is composed of a solid lithium-ion conductor which has a garnet-like crystal structure and has been deposited on the lithium transition metal oxide by a physical process.

In lithium-ion batteries, both the cathode active material and the anode active material must be capable of reversibly absorbing and releasing lithium ions. In the prior art, lithium-ion batteries are generally assembled and finished in the fully uncharged state. This corresponds to a state in which the lithium ions are fully intercalated, i.e., incorporated, in the cathode, while the anode typically does not contain any active, i.e., reversibly cyclable, lithium ions.

In the first charging operation of the lithium-ion battery, also referred to as "formation," the lithium ions leave the cathode and are incorporated in the anode. This first charging operation comprises complex processes with a multiplicity of reactions taking place between the various components of the lithium-ion battery.

Of particular importance here is the formation of an interface between the active material and the electrolyte on the anode which is also known as the "solid electrolyte interface" or "SEI." The formation of the SEI, which may also be considered a protective layer, is substantially attributable to decomposition reactions of the electrolyte (dissolved lithium conducting salt in organic solvents) with the surface of the anode active material.

However, buildup of the SEI requires lithium, which is then no longer available for cycling in the charging and discharging process. The difference in capacity after the first charge and the capacity after the first discharge, relative to the charging capacity, is referred to as the formation loss and may be in the range from about 5% to 40%, depending on the employed cathode and anode active material.

In the case of a lithium-ion battery having a cathode based on the layered oxide lithium nickel manganese cobalt oxide (NMC) and a graphite-based anode the formation losses may be about 6%-20%. The nominal capacity of the lithium ion battery is reduced accordingly. The formation losses when using a layered oxide cathode (for example NMC) result not only from the losses due to SEI formation on the anode but also from the fact that, upon discharging of the lithium-ion battery, not all reversibly cyclable lithium ions from the lithium-laden anode can be incorporated into the NMC at standard current rates.

It is an object of the present disclosure to provide a cathode active material for a lithium-ion battery which is suitable for reducing the formation losses of the lithium-ion battery, so that the lithium-ion battery especially features an elevated specific energy and energy density.

This object may be achieved by a cathode active material according to the independent claim. Advantageous embodiments and developments of the technology are the subject of the dependent claims.

In one embodiment of the invention, the cathode active material comprises particles having a core-shell structure. The particles each have a core, wherein the material of the core ("core material") is selected from the group consisting of layered oxides, including overlithiated layered oxides (OLO), compounds having an olivine structure, compounds having a spinel structure and combinations thereof. The particles moreover each have a shell. The material of the shell ("shell material") may in particular have been applied to the core of the particle with a coating process. Coating processes suitable therefor are known per se from the published specification DE 10 2014 205 945 A1 referred to in the introduction.

In one embodiment of the invention, material of the shell comprises a spinel compound. The material of the shell is preferably at least partially delithiated. Alternatively or in addition the material of the core is at least partially delithiated. In other words, the material of the shell and/or the material of the core has a degree of lithiation x<1. The term "degree of lithiation" here and hereinafter refers to the content of reversibly cyclable lithium, in the form of lithium ions and/or metallic lithium, relative to the maximum content of reversibly cyclable lithium of the active material. In other words, the degree of lithiation is a measure of the proportion of the maximum cyclable lithium content that is incorporated/intercalated within the structure. A degree of lithiation of 1 describes a fully lithiated active material while a degree of lithiation of 0 indicates a fully delithiated active material. For example, in a stoichiometric spinel $LiMn_2O_4$ the degree of lithiation is x=1 and in pure $\lambda$-$Mn_2O_4$, accordingly, x=0.

After filling with electrolyte and in particular during the first charging and/or discharging operation, and depending on the respective voltage window of the material of the core and of the shell, the lithium ions may not be uniformly incorporated into the materials of the core and shell. Accordingly, the degrees of lithiation of the materials of the core and shell after filling the lithium-ion battery with electrolyte and/or after the first discharging and/or charging operation can differ from the starting state in the cathode active material. The reported degrees of lithiation in the cathode active material according to this disclosure therefore refer to the state before the first discharging and/or charging operation and, in particular, before filling the lithium-ion battery with electrolyte.

The material of the core may include a layered oxide such as, for example, nickel manganese cobalt oxide (NMC), lithium nickel cobalt aluminum oxide (NCA) or lithium cobalt oxide (LCO). The layered oxide may in particular be an overlithiated layered oxide (OLO). The material of the core may alternatively include a compound having a spinel structure such as, for example, lithium manganese oxide (LMO) or lithium nickel manganese oxide (LNMO), or a compound having an olivine structure such as, for example, lithium iron phosphate (LFP; $LiFePO_4$) or lithium (manganese or cobalt) iron phosphate (LMFP, M=Mn or Co for example).

To form a shell, the core of the cathode active material is surface-coated with preferably an at least partially delithiated spinel compound. In principle, any desired spinel compound may be suitable. The spinel compound is preferably a manganese-containing spinel, in particular, an exclusively manganese-containing spinel (for example, $\lambda$-$Mn_2O_4$, $Li_xMn_2O_4$ where $0 \leq x$). In the cathode active material, the material of the core and/or the material of the shell of the particles is at least partially delithiated. In particular, an equilibrium of lithium ions may be established between the two active materials of the core and the shell since these lithium-ion conductors are in direct contact with one another (direct contact between core and shell).

The cathode active material having the core-shell structure may be made into a positive composite electrode comprising, for example, the cathode active material, an electrode binder and an electrical conductivity additive, for example, conductive carbon black, by conventional electrode production processes.

The technology is based in particular on the following considerations: It has surprisingly been found that the material of the shell of the proposed cathode active material exhibits stable adhesion to the material of the core even upon mixing at high shear forces and upon calendaring at high pressures. The partially or fully delithiated shell composed of a spinel compound and/or the at least partially delithiated core absorb lithium ions, which can no longer be intercalated into the core at standard current rates and temperatures. This reduces formation losses, and the lithium-ion battery therefore has an elevated specific energy and energy density. This is advantageously achieved without the use of costly and scarce nickel and/or cobalt. The compound having a spinel structure in the shell of the particles is chemically and electrochemically more stable towards the electrolyte than, for example, layered oxides such as NMC or NCA. This results in low gas evolution over the lifetime of the battery or in the event of overcharging. The shell composed of a material having a spinel structure makes the cathode-active material intrinsically safer in the delithiated state than, for example, delithiated NMC under electrical, mechanical and/or thermal stress.

In one embodiment, the material of the shell is a manganese spinel, in particular, an exclusively manganese-containing spinel. Particularly preferred materials of the shell are $\lambda$-$Mn_2O_4$ or $Li_xMn_2O$ having a degree of lithiation of $x \leq 1$. The degree of lithiation may in particular be x=0. $\lambda$-$Mn_2O_4$ has a reversible specific capacity of 148 mAh/g, fast kinetics and an average discharging voltage of about 3.9 V versus lithium (3.8 V versus graphite).

In one embodiment, the material of the shell has a degree of lithiation x of $0 \leq x < 1$. The material of the shell may in particular also be fully delithiated (x=0). It is preferable when $0 \leq x \leq 0.9$ and particularly preferable when $x \leq 0.8$. The degree of lithiation may be, for example, $0.5 \leq x \leq 0.9$, in particular $0.6 \leq x \leq 0.8$. The lower the degree of lithiation of the material of the shell, the thinner the shell may be.

In one embodiment, the particles of the cathode active material have a diameter from 0.1 μm to 40 μm inclusive. The diameter is here to be understood as meaning the total diameter of the particles consisting of the core and the shell. The particles preferably have a diameter from 1 μm to 20 μm inclusive.

In one embodiment, the shell of the particles has a thickness from 0.01 μm to 5 μm inclusive. The shell of the particles preferably has a thickness from 0.05 μm to 1 μm inclusive. The thickness of the shell is preferably smaller than the diameter of the core. The diameter of the core may in particular be at least 2 times, at least 5 times, at least 10 times or even at least 20 times as large as the thickness of the shell. The shell which is relatively thin compared to the core may be applied to the core relatively easily via a coating process.

In one embodiment, the core of the particle is fully lithiated. This makes it possible to achieve a high energy density.

Also proposed is a lithium-ion battery comprising a cathode comprising the above-described cathode active material. The lithium-ion battery may comprise, for example, only a single battery cell or may alternatively comprise one or more modules comprising a plurality of battery cells, wherein the battery cells may be connected in series and/or parallel. The lithium-ion battery comprises at least one cathode comprising the cathode active material having the core-shell structure and an anode comprising at least one anode active material. The lithium ion battery may further comprise the further constituents of a lithium-ion battery known per se, in particular current collectors, a separator and an electrolyte.

The lithium ion battery according to the invention may in particular be employed in a motor vehicle or in a portable device. The portable device may in particular be a smartphone, an electrical tool/power tool, a tablet or a wearable. The lithium-ion battery may alternatively or also be employed in a stationary energy storage means.

Further advantages and properties of the invention are apparent from the following description of an exemplary embodiment in conjunction with the figures.

The constituents shown and the size ratios of the constituents relative to one another are not to scale.

DETAILED DESCRIPTION OF THE DRAWINGS

Figure 1:
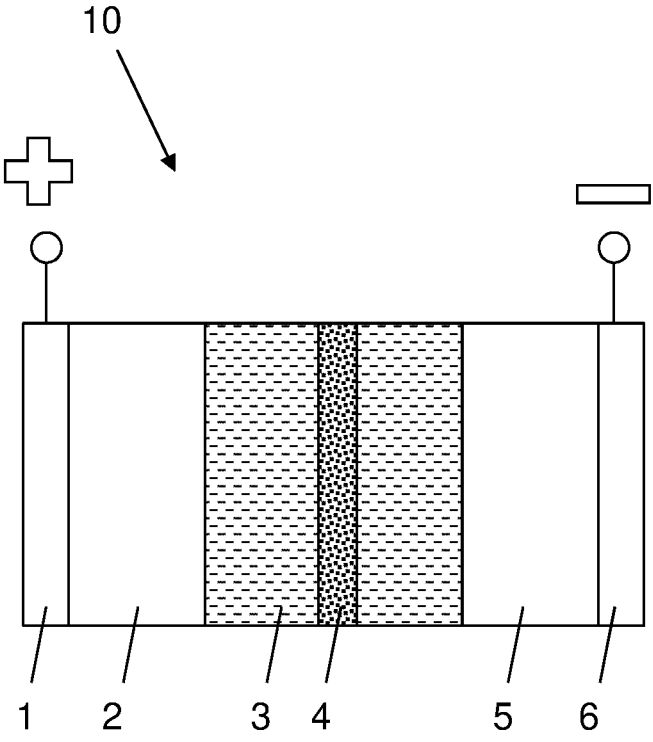
FIG. 1 is a schematic diagram of the construction of a lithium-ion battery according to one exemplary embodiment.

The lithium-ion battery 10 shown in purely schematic form in FIG. 1 has a cathode 2 and an anode 5. The cathode 2 and the anode 5 each have a current collector 1, 6, wherein the current collectors may be in the form of metal foils. The current collector 1 of the cathode 2 may comprise aluminum, for example, and the current collector 6 of the anode 5 may comprise copper, for example.

The cathode 2 and the anode 5 are separated from one another via a separator 4 which is permeable to lithium ions but impermeable to electrons. Separators that may be employed include polymers, in particular a polymer selected from the group consisting of polyesters, in particular polyethylene terephthalate, polyolefins, in particular polyethylene and/or polypropylene, polyacrylonitriles, polyvinylidene fluoride, polyvinylidene-hexafluoropropylene, polyether imide, polyimide, aramid, polyether, polyether ketone, synthetic spider silk or mixtures thereof. A separator may optionally also be coated with ceramic material and a binder, for example, based on $Al_2O_3$.

In addition, the lithium-ion battery comprises an electrolyte 3 which is conductive for lithium ions and which may be a solid electrolyte or a liquid comprising a solvent and at least one lithium conductive salt dissolved therein, for example, lithium hexafluorophosphate ($LiPF_6$). The solvent is preferably inert. Suitable solvents are for example organic solvents such as ethylene carbonate, propylene carbonate, butylene carbonate, dimethyl carbonate, diethyl carbonate, ethyl methyl carbonate, fluoroethylene carbonate (FEC), sulfolanes, 2-methyltetrahydrofuran, acetonitrile and 1,3-dioxolane. Employable solvents also including ionic liquids. Such ionic liquids contain exclusively ions. Preferable cations, which may especially be alkylated, are imidazolium, pyridinium, pyrrolidinium, guanidinium, uronium, thiuronium, piperidinium, morpholinium, sulfonium, ammonium and phosphonium cations. Examples of employable anions include halide, tetrafluoroborate, trifluoroacetate, triflate, hexafluorophosphate, phosphinate and tosylate anions. Examples of ionic liquids include: N-methyl-N-propylpiperidinium bis(trifluormethylsulfonyl)imide, N-methyl-N-butylpyrrolidinium bis(trifluoromethylsulfonyl)imide, N-butyl-N-trimethylammonium bis(trifluormethylsulfonyl)imide, triethylsulfonium bis(trifluormethylsulfonyl)imide and N,N-diethyl-N-methyl-N-(2-methoxyethyl) ammonium bis(trifluormethylsulfonyl)imide. In one variant, two or more of the abovementioned liquids may be used. Preferred conductive salts are lithium salts which comprise inert anions and which are preferably non-toxic. Suitable lithium salt are in particular lithium hexafluorophosphate ($LiPF_6$), lithium tetrafluoroborate ($LiBF_4$) and mixtures of these salts. The separator 4 may be impregnated/wetted with the lithium salt electrolyte if the salt is liquid.

The anode 5 comprises an anode active material. The anode active material may be selected from the group consisting of carbon-containing materials, silicon, silicon suboxide, silicon alloys, aluminum alloys, indium, indium alloys, tin, tin alloys, cobalt alloys and mixtures thereof. The anode active material is preferably selected from the group consisting of synthetic graphite, natural graphite, graphene, mesocarbon, doped carbon, hard carbon, soft carbon, fullerene, silicon-carbon composite, silicon, surface-coated silicon, silicon suboxide, silicon alloys, lithium, aluminum alloys, indium, tin alloys, cobalt alloys, and mixtures thereof. Also suitable, in principle, are further anode active materials known per se from the prior art, for example niobium pentoxide, titanium dioxide, titanates such as lithium titanate ($Li_4Ti_5O_{12}$), tin dioxide, lithium, lithium alloys and/or mixtures thereof.

Figure 2:
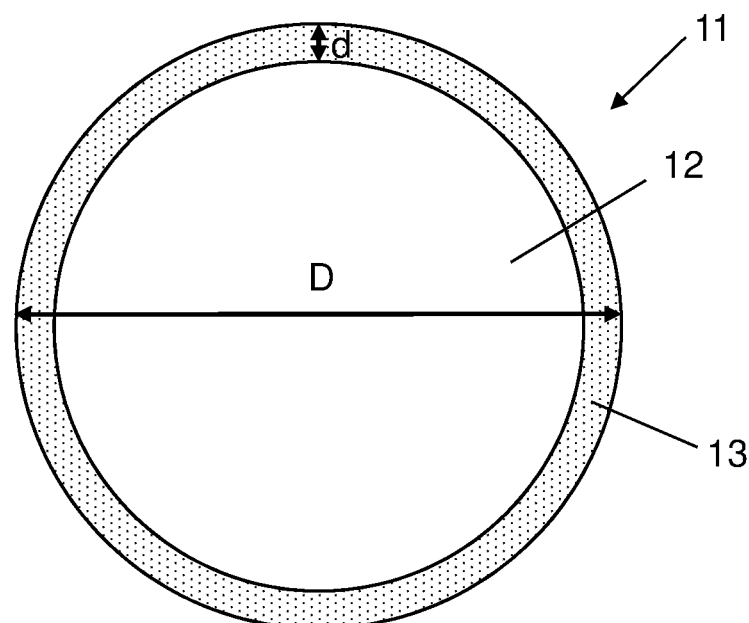
FIG. 2 is a schematic diagram of a particle of the cathode active material in the exemplary embodiment.

In the lithium-ion battery 10, the cathode 2 comprises a cathode active material having a core-shell structure. The cathode active material comprises a multiplicity of particles 11. A schematic diagram of a particle 11 is shown in schematic form in FIG. 2. The particles 11 each comprise a core 12 and a shell 13. The diameter D of the particles 11 of the cathode active material is on average from 0.1 μm to 40 μm inclusive, preferably from 1 μm to 20 μm inclusive. The shell 13 of the particles 11 on average has a thickness d in the range from 0.01 μm to 5 μm inclusive, preferably from 0.05 μm to 1 μm inclusive.

The material of the core 12 may comprise a layered oxide such as, for example, NMC, NCA or LCO. The layered oxide may in particular be an overlithiated layered oxide (OLO). Alternatively, the material of the core 12 may be a compound having a spinel structure, for example LMO or LMNO, or a compound having an olivine structure, for example LFP or LMFP. The material of the shell 13 is a spinel compound, preferably comprising an exclusively manganese-containing spinel (for example $\lambda\text{-}Mn_2O_4$, $Li_xMn_2O_4$ where $x \leq 1$). The material of the core 12 and/or the material of the shell 13 are at least partially delithiated.

Production of a lithium-ion battery 10 comprising the core-shell cathode active material and an anode active material is hereinafter elucidated using a reference example, which does not have all of the features of the invention, and using an inventive exemplary embodiment.

Table 1 summarizes the substances and materials used in the examples.

TABLE 1

| Employed substances and materials. | |
| --- | --- |
| | Description |
| NMC811 | $LiNi_{0.8}Mn_{0.1}Co_{0.1}O_2$ |
| $\lambda\text{-}Mn_2O_4$ | Manganese spinel, shell material of the cathode active material |
| PVdF | Polyvinylidene fluoride, binder |
| NMP (electronic grade) | N-methyl-2-pyrrolidone carrier solvent |
| Aluminum carrier foil | Carrier foil for cathode |
| Natural graphite | Anode active material |
| SBR | Styrene-butadiene rubber, binder |
| CMC | Carboxymethylcellulose, binder |
| Super C65 (conductivity carbon black) | Conductivity additive |
| Copper carrier foil | Carrier foil for anode |
| Celgard Separator 2500 | Separator (25 μm) made of polypropylene (PP) |
| Liquid electrolyte, comprising a solution of $LiPF_6$ in organic carbonates (e.g. ethylene carbonate (EC), diethylene carbonate (DEC)) | Liquid electrolyte comprising lithium conductivity salt |
| Aluminum laminated film | Packaging film for the cell |

EXAMPLE 1 (REFERENCE EXAMPLE)

A mixture of 94% by weight of NMC811, 3% by weight of PVdF and 3% by weight of conductivity carbon black is suspended in NMP with a high-shear dissolver-mixer at 20° C. This affords a homogeneous coating composition which is doctor-blade-coated onto a 15 μm rolled aluminum carrier foil. Removing the NMP affords a composite cathode film having a basis weight of 21.3 mg/cm².

In analogous fashion, an anode coating composition having a composition of 94% by weight of natural graphite, 2% by weight of SBR, 2% by weight of CMC and 2% by weight of Super C65 was produced and applied to a 10 μm rolled copper carrier foil. The resulting anode film has a basis weight of 12.7 mg/cm$^2$.

The cathode 2 comprising the cathode film is assembled with an anode 5 comprising the anode film, a separator 4 (25 μm) made of polypropylene (PP) and a liquid electrolyte 3 comprising a 1 M solution of LiPF$_6$ in EC/DMC (3:7 w/w) to afford a lithium-ion battery 10 having a 25 cm$^2$ active electrode area, which is packaged in high-specification aluminum laminated film (thickness: 0.12 mm) and sealed. This affords a pouch cell having external dimensions of about 0.5 mm×6.4 mm×4.3 mm.

The lithium-ion battery 10 is subjected to a first charging to 4.2 V (C/10) and subsequently discharged to 2.8 V at C/10. The capacity of the first charging is 111 mAh and the capacity of the first discharging is 100 mAh. This results in a formation loss of about 10% for the complete lithium-ion battery 10. This corresponds to the expected formation loss of about 10% when using graphite as the anode active material.

EXAMPLE 2 (LITHIUM-ION BATTERY ACCORDING TO ONE EXEMPLARY EMBODIMENT OF THE INVENTION)

A mixture of 94% by weight of the disclosed cathode active material (consisting of ~ 5.5% by weight of a λ-Mn$_2$O$_4$ shell and ~ 94.5% by weight of an NMC811 core), 3% by weight of PVdF and 3% by weight of conductivity carbon black is suspended in NMP with a high-shear mixing apparatus at 20° C. The diameter of the core 12 of the particles 11 is about 5 μm and the thickness of the shell is about 0.06 μm. This affords a homogeneous coating composition which is doctor-blade-coated onto a 15 μm rolled aluminum collector-carrier foil. Removing the NMP affords a cathode film having a basis weight of 22.6 mg/cm$^2$.

In analogous fashion, an anode coating composition having a composition of 94% by weight of natural graphite, 2% by weight of SBR, 2% by weight of CMC and 2% by weight of Super C65 was produced and applied to a 10 μm rolled copper carrier foil. The resulting anode film has a basis weight of 12.7 mg/cm$^2$.

The cathode 2 comprising the cathode film is assembled with an anode 5 comprising the anode film, a separator 4 (25 μm) and an electrolyte 3 comprising a 1 M solution of LiPF$_6$ in EC/DMC (3:7 w/w) to afford a lithium-ion battery 10 having a 25 cm$^2$ electrode area which is packaged in aluminum laminated film (thickness: 0.12 mm) and sealed. This affords a pouch cell having external dimensions of about 0.5 mm×6.4 mm×4.3 mm.

The lithium-ion battery 10 is subjected to a first charging to 4.2 V (C/10) and subsequently discharged to 2.8 V at C/10. A charging of 111 mAh is observed for the first charging at C/10 while for the first C/10 discharging 104.5 mAh is observed.

Comparison of the Examples

The use of the core-shell cathode active material (example 2) in the cathode 2 results in a higher nominal capacity of the lithium-ion battery 10 relative to the reference example. This corresponds to a reduced formation loss which results from the fact that the spinel can absorb further cyclable lithium from the lithiated anode during the discharging. The increase in the basis weight of the cathode film in example 2 compared to the reference example (22.6 mg/cm$^2$ instead of 21.3 mg/cm$^2$) is a result of the λ-Mn$_2$O$_4$ particle shell 13—the proportion of cobalt and nickel is the same in the two examples. It may alternatively or also be possible, to keep the nominal capacity constant for the inventive lithium-ion battery 10, and instead reduce the proportion of cobalt and nickel.

The lithium-ion battery 10 is not limited to graphite as the anode active material; it is advantageously also possible to utilize silicon-based anode active materials or other anode active materials.

Although the invention has been illustrated and described in detail using exemplary embodiments the invention is not limited by the exemplary embodiments. On the contrary, other variations of the invention may be derived therefrom without departing from the scope of protection of the invention defined by the claims.

LIST OF REFERENCE NUMERALS

1 Current collector
2 Cathode
3 Electrolyte
4 Separator
5 Anode
6 Current collector
10 Lithium-ion battery
11 Particle
12 Core
13 Shell

The invention claimed is:

1. A cathode active material for a lithium-ion battery, the cathode active material comprising:

particles having a core-shell structure, each of the particles having a core comprising a core material and a shell comprising a shell material, wherein the core material is selected from the group consisting of: layered oxides, including overlithiated layered oxides, compounds having an olivine structure, compounds having a spinel structure and combinations thereof, the shell material comprises a manganese-containing spinel compound where manganese is the only transition metal present, the shell material being λ-Mn$_2$O$_4$ or Li$_x$Mn$_2$O$_4$, the shell material has a degree of lithiation of x≤0.9, and the core material is optionally at least partially delithiated.

2. The cathode active material according to claim 1, wherein the particles have a diameter from 0.1 μm to 40 μm inclusive.

3. The cathode active material according to claim 2, wherein the particles have a diameter from 1 μm to 20 μm inclusive.

4. The cathode active material according to claim 1, wherein the shell has a thickness from 0.01 μm to 5 μm inclusive.

5. The cathode active material according to claim 4, wherein the shell has a thickness from 0.05 μm to 1 μm inclusive.

6. The cathode active material according to claim 1, wherein the core is fully lithiated.

7. A lithium-ion battery comprising:

a cathode comprising a cathode active material according to claim 1.

8. The cathode active material according to claim 1, wherein $0.5 \leq x \leq 0.9$.

\* \* \* \* \*